United States Patent
Roberts

[15] 3,667,299
[45] June 6, 1972

[54] WHEEL MOUNTING ADAPTOR FOR USE IN WHEEL BALANCING

[72] Inventor: Warren A. Roberts, 514 Clinton Street, Redwood City, Calif. 94062

[22] Filed: May 6, 1970

[21] Appl. No.: 35,218

[52] U.S. Cl. .............................73/487, 144/288 A, 157/1.24
[51] Int. Cl. .....................................G01m 1/02, B60c 25/06
[58] Field of Search ....................................73/482–487, 66; 144/288; 157/1.1, 1.24

[56] References Cited

UNITED STATES PATENTS 2,176,269  10/1939  Morse......................................73/482
3,349,626  10/1967  Palacios...................................73/487

*Primary Examiner*—Richard C. Queisser
*Assistant Examiner*—Herbert Goldstein
*Attorney*—Roland I. Griffin

[57] ABSTRACT

An evenly balanced annular plate for being mounted on the balancing head of a bubble wheel balancer is provided on at least one side with a plurality of rotatably captivated and symmetrically spaced balls for engaging a like plurality of lug holes of a wheel to support the wheel on the balancing head of the bubble wheel balancer.

9 Claims, 6 Drawing Figures

PATENTED JUN 6 1972

INVENTOR
WARREN A. ROBERTS
BY Roland D. Griffin
ATTORNEY

INVENTOR
WARREN A. ROBERTS
BY Roland D. Griffin
ATTORNEY

WHEEL MOUNTING ADAPTOR FOR USE IN WHEEL BALANCING

BACKGROUND AND SUMMARY OF THE INVENTION

This invention relates to wheel mounting adaptors for use in mounting wheels on conventional bubble wheel balancers.

The type of wheel mounting adaptor typically employed for mounting a wheel on a conventional bubble wheel balancer must be bolted to the wheel. This type of wheel mounting adaptor is inconvenient and slow to use. An improved type of wheel mounting adaptor that does not have to be bolted to the wheel is shown and described in my copending U. S. Pat. application Ser. No. 763,771 entitled ADAPTORS FOR USE IN TIRE CHANGING AND WHEEL BALANCING and filed on Sept. 30, 1968, now U.S. Pat. No. 3,580,320 dated May 25, 1971. However, neither this nor the first-mentioned type of wheel mounting adaptor is self-centering with respect to the wheel and neither type works very well with bent wheels.

Accordingly, it is the principal object of this invention to provide an improved, time-saving, and self-centering wheel mounting adaptor for use in quickly, conveniently, and properly mounting a wheel on nearly any conventional bubble wheel balancer.

It is another object of this invention to provide an improved wheel mounting adaptor that may be used for more effectively mounting bent wheels and Volkswagen, eight-lug Pontiac, or other such car wheels that do not have a circular axle clearance hole of standard size on nearly any conventional bubble wheel balancer.

These and other objects, which will become apparent from a reading of this specification and an inspection of the accompanying drawings, are accomplished in accordance with the preferred embodiments of this invention by providing an evenly balanced annular plate for being mounted on the balancing head of a bubble wheel balancer and by rotatably captivating a first plurality of balls on one side of this annular plate at fixed positions symmetrically spaced therearound. These balls are located along a first circle to provide a rolling bolt circle for rotatably engaging a plurality of lug holes of a first type of wheel to support the first type of wheel on the balancing head of a bubble wheel balancer.

In accordance with one of the preferred embodiments of this invention, a second plurality of balls is rotatably captivated on the opposite side of the annular plate at fixed positions symmetrically spaced therearound. These balls are located along a second circle concentrically positioned around the first circle to provide a rolling bolt circle for rotatably engaging a plurality of lug holes of a second type of wheel to support the second type of wheel on the balancing head of the bubble wheel balancer. A plurality of pins is mounted on the same side of the annular plate as the first plurality of balls at fixed positions symmetrically spaced therearound. These pins uniformly extend above the first plurality of balls and are located along a third circle concentrically positioned within the first circle so that they protrude within the axle clearance hole of the first type of wheel when it is mounted on the balancing head of the bubble wheel balancer and so that they support the annular plate on the balancing head of the bubble wheel balancer when the annular plate is turned over to mount the second type of wheel on the balancing head of the bubble wheel balancer.

DESCRIPTION OF THE PREFERRED EMBODIMENTS

Figure 1:
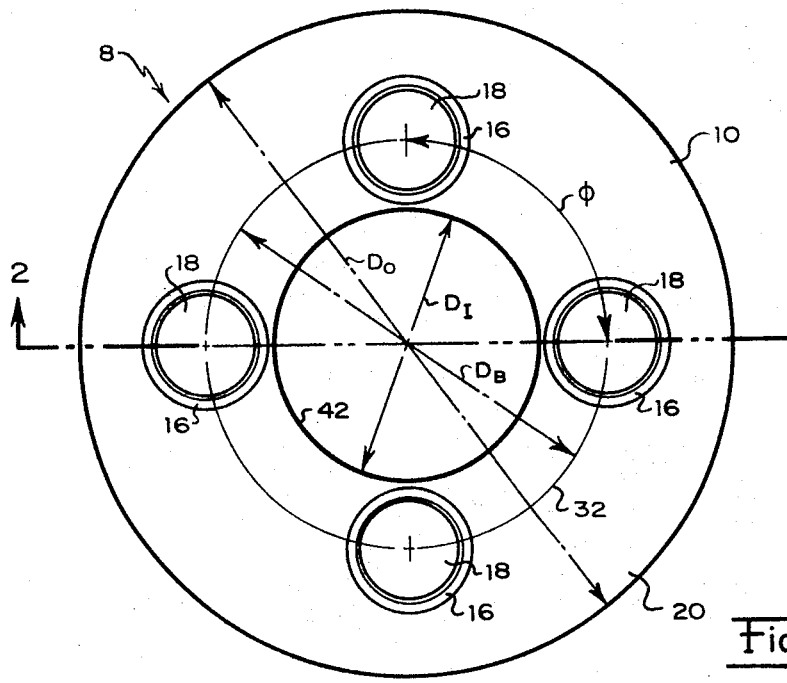
FIG. 1 is a plan view of a wheel mounting adaptor according to one of the preferred embodiments of this invention.
Figure 2:
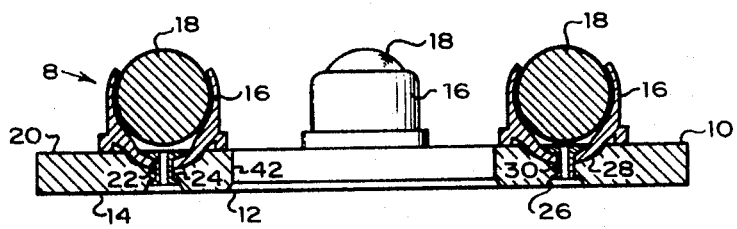
FIG. 2 is a cross-sectional elevational view of the wheel mounting adaptor of FIG. 1 taken along the line 2—2 of FIG. 1.

Referring now to FIGS. 1–2, there is shown a wheel mounting adaptor 8 comprising an annular plate 10. This annular plate may be stamped or otherwise machined or formed, for example, from an aluminum, steel, or plastic-bonded paper phenolic blank. The lower inner edge 12 of annular plate 10 is chamfered, as shown in FIG. 2, to form an angle of from about 30° to 60° with respect to the lower surface 14 of the annular plate. A plurality of generally circular cup-shaped retainers 16 for rotatably captivating a like plurality of balls 18 is mounted on the upper surface 20 of annular plate 10 at fixed positions symmetrically spaced therearound. Retainers 16 may be formed, for example, of polyethylene plastic and balls 18 may be formed, for example, of Teflon. Both the retainers and the balls may be purchased from FIVE DAY LABS INC., 445 Park Avenue, New York, N.Y. Each retainer 16 is provided with a central circular rivet hole 22 through its bottom wall and may therefore be fixedly mounted in place by drilling a corresponding circular rivet hole 24 through annular plate 10; by forming a concentric circular recess 26 in the lower surface 14 of the annular plate; by forming a concentric circular recess 28 in the upper surface 20 of the annular plate; by placing the bottom portion of the retainer in recess 28; and by pop riveting the retainer in place so that the pop rivet 30 does not protrude from the lower surface 14 of the annular plate. Once retainers 16 are mounted in place, balls 18 are forced into the retainers through the open top end thereof. The open top end of each retainer 16 is restricted for captivating the ball 18 forced into the retainer while allowing the ball to rotate in, and a portion of the ball to protrude from, the retainer. Retainers 16 are mounted for locating balls 18 along a first circle 32 to provide a rolling bolt circle for engaging a plurality of lug holes in the rim of a car or truck wheel.

Figure 3:
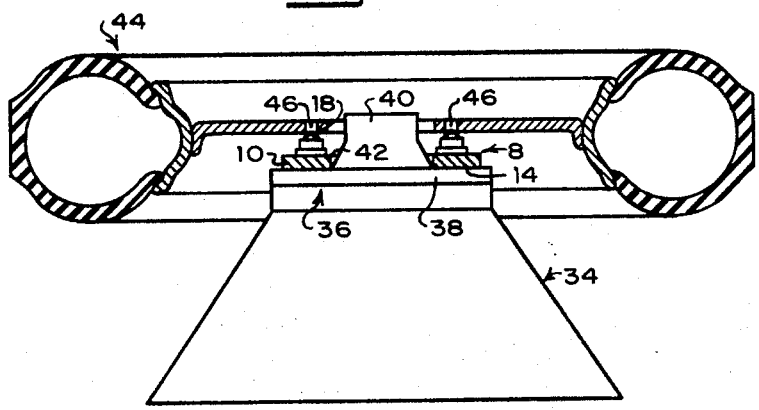
FIG. 3 is a cross-sectional elevational view showing how the wheel mounting adaptor of FIGS. 1-2 is employed to mount a car wheel on the balancing head of a bubble wheel balancer.

As illustrated in FIG. 3, wheel mounting adaptor 8 may be employed for mounting a car or truck wheel on nearly any conventional bubble wheel balancer 34, such as the ATLAS M–60 bubble wheel balancer. This is accomplished by mounting annular plate 10 on the balancing head 36 of bubble wheel balancer 34 so that its lower surface 14 is supported upon the base 38 of balancing head 36 and so that it is engaged by protrusion of the central spring-biased cone 40 of the balancing head through its central aperture 42 to retain it in the proper position on the balancing head. The car or truck wheel 44 to be balanced is then simply mounted on wheel mounting adaptor 8 by orienting the wheel so that its lug holes 46 are engaged by rotatably captivated balls 18, which thereupon automatically rotate under the weight of the wheel to center the wheel with respect to the wheel mounting adaptor and thereafter retain the wheel in this centered position on balancing head 36 during the wheel balancing operation. Wheel mounting adaptor 8 is extremely convenient and quick to use since it does not have to be bolted to the wheel and since it automatically snaps the wheel into the proper centered position for balancing, even upon partial engagement of rotatably captivated balls 18 with lug holes 46 of the wheel, and thereafter positively retains the wheel in the proper centered position. Moreover, wheel mounting adaptor 8 may also be effectively used with bent wheels because of the self-centering action provided by rotatably captivated balls 18. Furthermore, if a ball 18 should become worn or damaged it may be quickly and simply replaced thereby prolonging the useful lifetime of the wheel mounting adaptor.

The outer diameter $D_o$ of annular plate 10, the inner diameter $D_I$ of annular pate 10, the diameter $D_B$ of the first bolt circle 32, and the angular spacing $\phi$ between rotatably captivated balls 18 may be altered as illustrated in the following chart to provide a wheel mounting adaptor 8 for mounting nearly any conventional car or truck wheel on nearly any conventional bubble wheel balancer.

| Type of wheel | $D_O$ (inches) | $D_I$ (inches) | $D_B$ (inches) | Number of balls | $\phi$ (degrees) |
|---|---|---|---|---|---|
| E.g., four-lug Corvair wheels | 7½ | 3 | 4½ | 4 | 90. |
| E.g., five-lug Corvair wheels | 7½ | 3 | 4½ | 5 | 72. |
| E.g., five-lug Ford car wheels | 7½ | 3 | 4¾ | 5 | 72. |
| E.g., five-lug Fleetwood wheels | 7½ | 3 | 5 | 5 | 72. |
| E.g., five-lug Ford truck wheels | 7½ | 3 | 5½ | 5 | 72. |
| E.g., six-lug Chevrolet GMC truck wheels. | 7½ | 3 | 5½ | 6 or 3 | 60 or 120. |
| E.g., eight-lug Chevrolet, Dodge, or Ford ¾ ton truck wheels. | 8½ | 3 | 6½ | 8 or 4 | 45 or 90. |
| E.g., five-lug Porsche or Volkswagen wheels. | 10 or 11¼ | 3 | 8 3/16 | 5 | 72. |
| E.g., eight-lug Pontiac wheels | 11½ | 3 | 10¼ | 8 or 4 | 45 or 90. |

Figure 4:
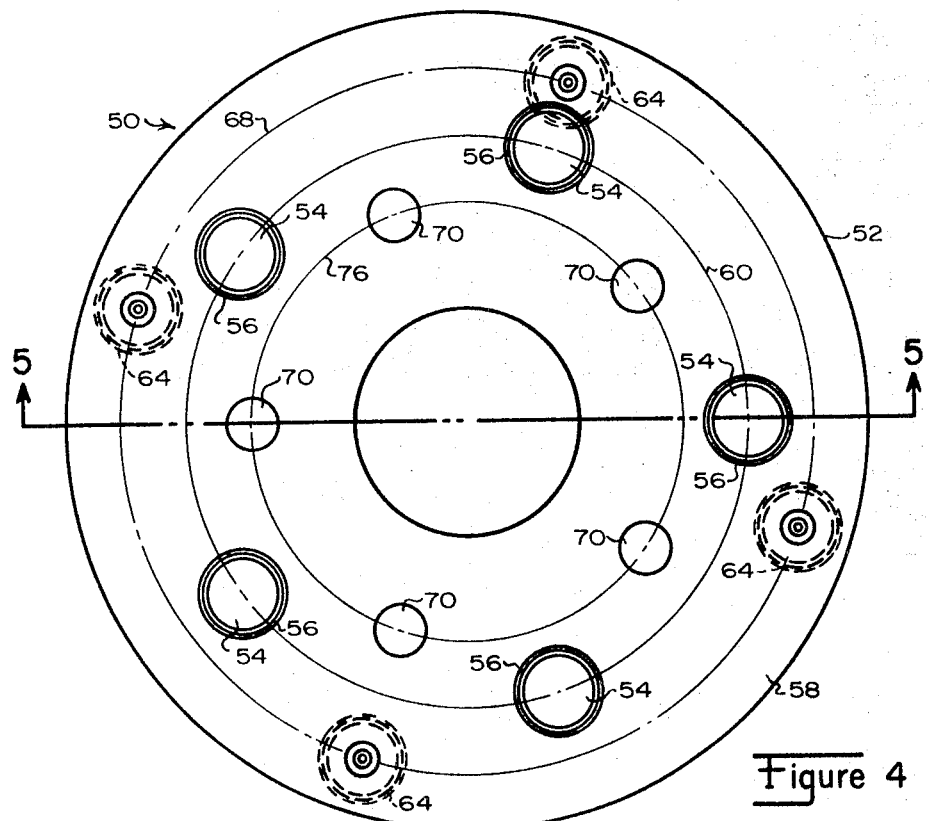
FIG. 4 is a plan view of a dual wheel mounting adaptor according to another of the preferred embodiments of this invention.
Figure 5:
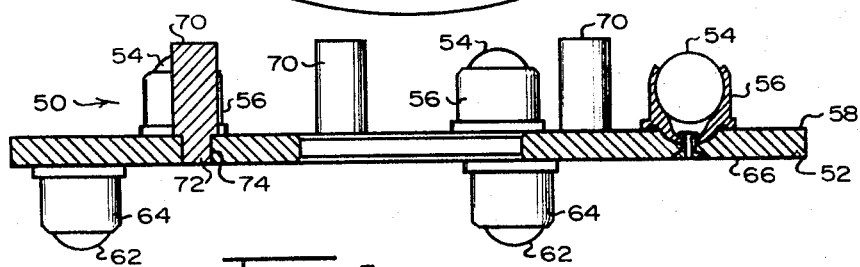
FIG. 5 is a cross-sectional elevational view of the dual wheel mounting adaptor of FIG. 4 taken along the line 5–5 of FIG. 4.
Figure 6:
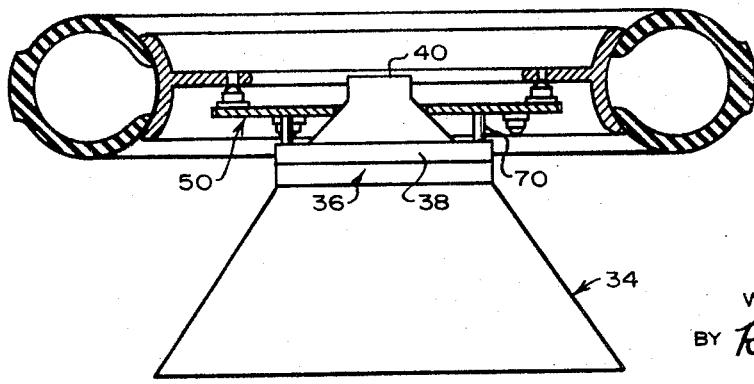
FIG. 6 is a cross-sectional elevational view showing how the dual wheel mounting adaptor of FIGS. 4–5 is employed to mount an eight-lug Pontiac wheel on the balancing head of a bubble wheel balancer.

Referring now to FIGS. 4–5, there is shown a dual wheel mounting adaptor 50 that may be employed, for example, to mount either a five-lug Volkswagen wheel or an eight-lug Pontiac wheel on nearly any conventional bubble wheel balancer. This dual wheel mounting adaptor also comprises an annular plate 52 like that described above in connection with FIGS. 1–3 except that both its upper and lower inner edges are chamfered. Five balls 54 are rotatably captivated by five retainers 56 on one side 58 of annular plate 52 at fixed positions symmetrically spaced therearound. Retainers 56 are fixedly mounted for locating balls 54 along a first circle 60 to provide a first rolling bolt circle for engaging the lug holes in the rim of a five-lug Volkswagen wheel. Four balls 62 are rotatably captivated by four retainers 64 on the opposite side 66 of annular plate 52 at fixed positions symmetrically spaced therearound. Retainers 64 are fixedly mounted for locating balls 62 along a second circle 68 concentrically positioned around the first circle 60 to provide a second rolling bolt circle for engaging the lug holes in the rim of an eight-lug Pontiac wheel. Balls 54 and 62 and retainers 56 and 64 may be the same type and mounted in the same way as those described above in connection with FIGS. 1–3. Five pins 70 made, for example, of steel or aluminum are mounted on side 58 of annular plate 52 at fixed positions symmetrically spaced therearound and between adjacent retainers 56. Each pin 70 may be mounted, for example, by press-fitting a reduced-diameter end portion 72 thereof into a slightly smaller hole 74 in plate 52 as shown in FIG. 5. Pins 70 uniformly extend a finite distance above the uppermost surface of balls 54 and are located along a third circle 76 concentrically positioned within the first circle 60 so that they protrude within the axle clearance hole of a Volkswagen wheel when it is mounted on bubble wheel balancer 34 by wheel mounting adaptor 50 and so that they will support the wheel mounting adaptor on the base 38 of balancing head 36 of the bubble wheel balancer when the wheel mounting adaptor is turned over to mount an eight-lug Pontiac wheel on the bubble wheel balancer as shown in FIG. 6. Dual wheel mounting adaptor 50 may have the dimensions indicated in the chart above for five-lug Volkswagen and eight-lug Pontiac wheels. The indicated diameter $D_B$ of the second bolt circle 68 (i.e. 10¼ inches) is sufficiently large that balls 62 and retainers 64 do not prevent side 66 of annular plate 52 from being supported by the base 38 of balancing head 36 when a Volkswagen wheel is mounted on bubble wheel balancer 34 by wheel mounting adaptor 50. In addition to the dimensions indicated in the chart above, the third circle 76 should have a diameter of about 6⅛ inches with pins 70 being spaced 72° apart therealong.

I claim:
1. A wheel mounting adaptor comprising:
   means for being removably mounted on a wheel handling device; and
   a first plurality of rotatable elements rotatably captivated on said means at fixed positions symmetrically spaced along a first circle for engaging a plurality of lug holes in the rim of a wheel to support the wheel on the wheel handling device.
2. A wheel mounting adaptor as in claim 1 wherein:
   said means comprises an annular plate for being removably mounted on a wheel handling device; and
   said first plurality of rotatable elements comprises a first plurality of balls rotatable captivated on one side of said annular plate at said fixed positions symmetrically spaced along the first circle for engaging a plurality of lug holes in the rim of a wheel to support the wheel on the wheel handling device.
3. A wheel mounting adaptor as in claim 2 including a first plurality of retainers fixedly mounted on said one side of said annular plate for rotatably captivating said first plurality of balls at said fixed positions symmetrically spaced along the first circle while allowing a portion of each ball to protrude therefrom for engaging a different lug hole in the rim of a wheel to support the wheel on the wheel handling device.
4. A wheel mounting adaptor as in claim 3 wherein:
   said wheel handling device is a bubble wheel balancer having a central balancing mechanism;
   said annular plate is evenly balanced in weight and adapted for being mounted on and engaged by the central balancing mechanism of the bubble wheel balancer; and
   said first plurality of balls provides a rolling bolt circle for supporting and automatically centering a wheel on said annular plate.
5. A wheel mounting adaptor as in claim 2 wherein:
   said first plurality of balls is operable for engaging a plurality of lug holes in the rim of a first type of wheel to support the first type of wheel on the wheel handling device; and
   said wheel mounting adaptor includes a second plurality of balls rotatably captivated on the opposite side of said annular plate at fixed positions symmetrically spaced along a second circle for engaging a plurality of lug holes in the rim of a second type of wheel to support the second type of wheel on the wheel handling device.
6. A wheel mounting adaptor as in claim 5 including a plurality of pins mounted on said one side of said annular plate at fixed positions symmetrically spaced along a third circle concentrically positioned within said first circle, said pins uniformly extending beyond said first plurality of balls to support said annular plate on said wheel handling device when the second type of wheel is to be supported on the wheel handling device.
7. A wheel mounting adaptor as in claim 6 including:
   a first plurality of retainers fixedly mounted on said one side of said annular plate for rotatably captivating said first plurality of balls at said fixed positions symmetrically spaced along the first circle while allowing a portion of each ball to protrude therefrom for engaging a different lug hole in the rim of the first type of wheel to support the first type of wheel on the wheel handling device; and
   a second plurality of retainers fixedly mounted on said opposite side of said annular plate for rotatably captivating said first plurality of balls at said fixed positions symmetrically spaced along the second circle while allowing a portion of each ball to protrude therefrom for engaging a different lug hole in the rim of the second type of wheel to support the second type of wheel on the wheel handling device.
8. A wheel mounting adaptor as in claim 7 wherein:
   said wheel handling device is a bubble wheel balancer having a central balancing mechanism;
   said annular plate is evenly balanced in weight and adapted for being mounted on and engaged by the central balancing mechanism of the bubble wheel balancer;

said first plurality of balls provides a first rolling bolt circle for supporting and automatically centering the first type of wheel on said annular plate; and said second plurality of balls provides a second rolling bolt circle for supporting and automatically centering the second type of wheel on said annular plate.

9. A wheel mounting adaptor as in claim 2 including a plurality of pins mounted on the other side of said annular plate at fixed positions symmetrically spaced along a second circle to support said annular plate on said wheel handling device.

* * * * *